United States Patent [19]
Dong

[11] Patent Number: 5,864,956
[45] Date of Patent: Feb. 2, 1999

[54] LEVEL LINE AND LIMB LINE COMBINATION

[76] Inventor: Dawei Dong, 44113 S. Grimmer Blvd., Fremont, Calif. 94538-6350

[21] Appl. No.: 754,960

[22] Filed: Nov. 22, 1996

[51] Int. Cl.$^6$ ............................. G01C 15/12; G01B 11/26
[52] U.S. Cl. ................................. 33/227; 33/276; 33/280; 33/286; 33/DIG. 21
[58] Field of Search .......................... 33/227, 274, 275 R, 33/276, 278, 280, 286, 290, 567, 567.1, DIG. 21

[56] References Cited

U.S. PATENT DOCUMENTS

| | | | |
|---|---|---|---|
| 4,441,818 | 4/1984 | Wickman | 33/290 |
| 4,908,948 | 3/1990 | Gormley | 33/276 |
| 5,539,990 | 7/1996 | Le | 33/DIG. 21 |
| 5,594,993 | 1/1997 | Tager et al. | 33/227 |
| 5,621,975 | 4/1997 | Rando | 33/227 |

*Primary Examiner*—Christopher W. Fulton
*Attorney, Agent, or Firm*—The Kline law Firm

[57] ABSTRACT

A combination of square alloy rulers with precisely machined planes, each ruler unit having two 1.5v batteries and two bubble levels to level in all directions. A line generator is mounted in front of a laser diode module. This basic laser line ruler unit can produce an accurate laser level line or plumb line after it is calibrated. By adjusting the calibrating knob, the laser line ruler will produce a precise level line or plumb line when the level bubbles are centered. Putting a properly aligned level line unit and a properly aligned plumb line unit together will produce a cross line in front of the combination. Adding at least one more laser line ruler, that is combining three or more line units, will produce 90° lines, 45° lines, and 180° lines, as well as 270° lines up and down or on the right and left sides by simply adjusting the position of the relevant ruler. The housing of the ruler unit is machined with accurate planes and vertical angles. Therefore, the combination of several rulers can project accurate level lines, vertical lines, 45° lines, 90° lines, etc. This simple, small, and unique ruler combination is affordable to the public and can be widely used in hardwood layout and cutting, carpet cutting, squaring the surfaces of any plane object, etc. in addition to its usage in construction.

3 Claims, 4 Drawing Sheets

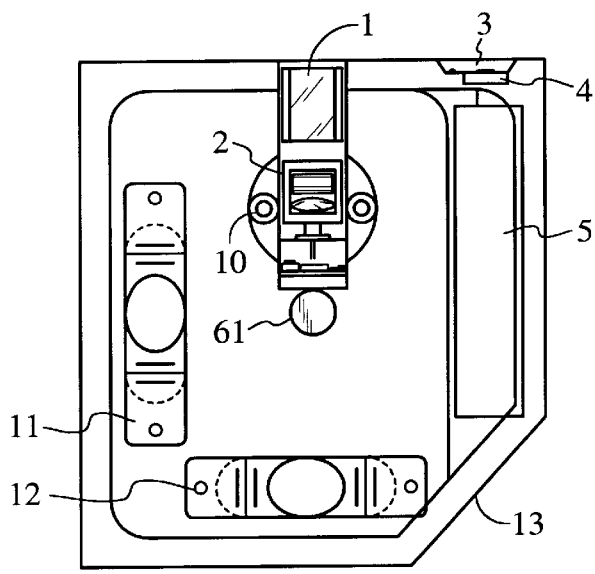
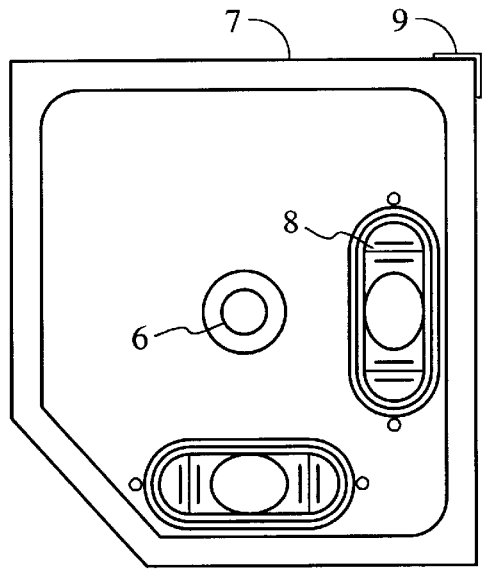
FIG. 1A   FIG. 1B
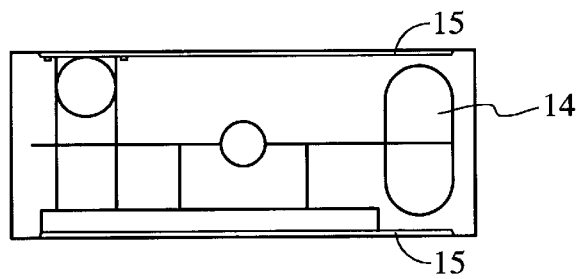
FIG. 1C

LEVEL LINE AND LIMB LINE COMBINATION

BACKGROUND OF THE INVENTION

The present invention relates generally to leveling instruments, and more particularly, is a laser leveling instrument capable of multiple modes of operation. The combination can produce several lines useful for construction.

Lasers have been used in the construction industry for many years. The rotary laser level is a very useful instrument which produces a plane of light for a reference for construction projects. However, the rotary laser level costs thousands of dollars, so only those who regularly undertake large construction projects can justify purchasing a rotary laser level. The laser level has not achieved widespread adoption by the general public despite the time savings because of its initial cost. In addition, its relatively large volume is not easy to carry about. Moreover, it has to be operated by a professional at a construction site. Therefore it is necessary to invent a new tool which is small, easy to carry and use, and affordable to ordinary workers and do-it-yourself builders. The present invention not only accomplishes the above, but it is also capable of producing level lines, plumb lines, cross lines, 90° lines, 45° lines, and so on. These lines are very useful in construction, particularly when installing drop ceilings, mounting cabinets, laying tiles, installing doors and windows, building outdoor decks, etc.

SUMMARY OF THE INVENTION

The present invention is a combination of square alloy rulers with precisely machined planes. It has two 1.5v batteries and two bubble levels to level in all directions. A line generator is mounted in front of a laser diode module. This basic laser line ruler can produce an accurate laser level line or plumb line after it is calibrated. By adjusting the calibrating knob, the laser line ruler will produce a precise level line or plumb line when the level bubbles are centered. Putting a properly aligned level line ruler and a properly aligned plumb line ruler together will produce a cross line in front of the combination. Adding at least one more laser line ruler, that is combining three or more line rulers, will produce 90° lines, 45° lines, and 180° lines, as well as 270° lines up and down or on the right and left sides by simply adjusting the position of the relevant ruler. The housing of the ruler is machined with accurate planes and vertical angles. Therefore, the combination of several rulers can project accurate level lines, vertical lines, 45° lines, 90° lines, etc. This simple, small, and unique ruler combination is affordable to the public and can be widely used in hardwood layout and cutting, carpet cutting, squaring the surfaces of any plane object, etc. in addition to its usage in construction.

BRIEF DESCRIPTION OF THE DRAWINGS

FIGS. 1A–C illustrate broken top, bottom, and side views, respectively, of the laser level unit of the present invention.

DETAILED DESCRIPTION OF THE PREFERRED EMBODIMENTS

Figure 2:
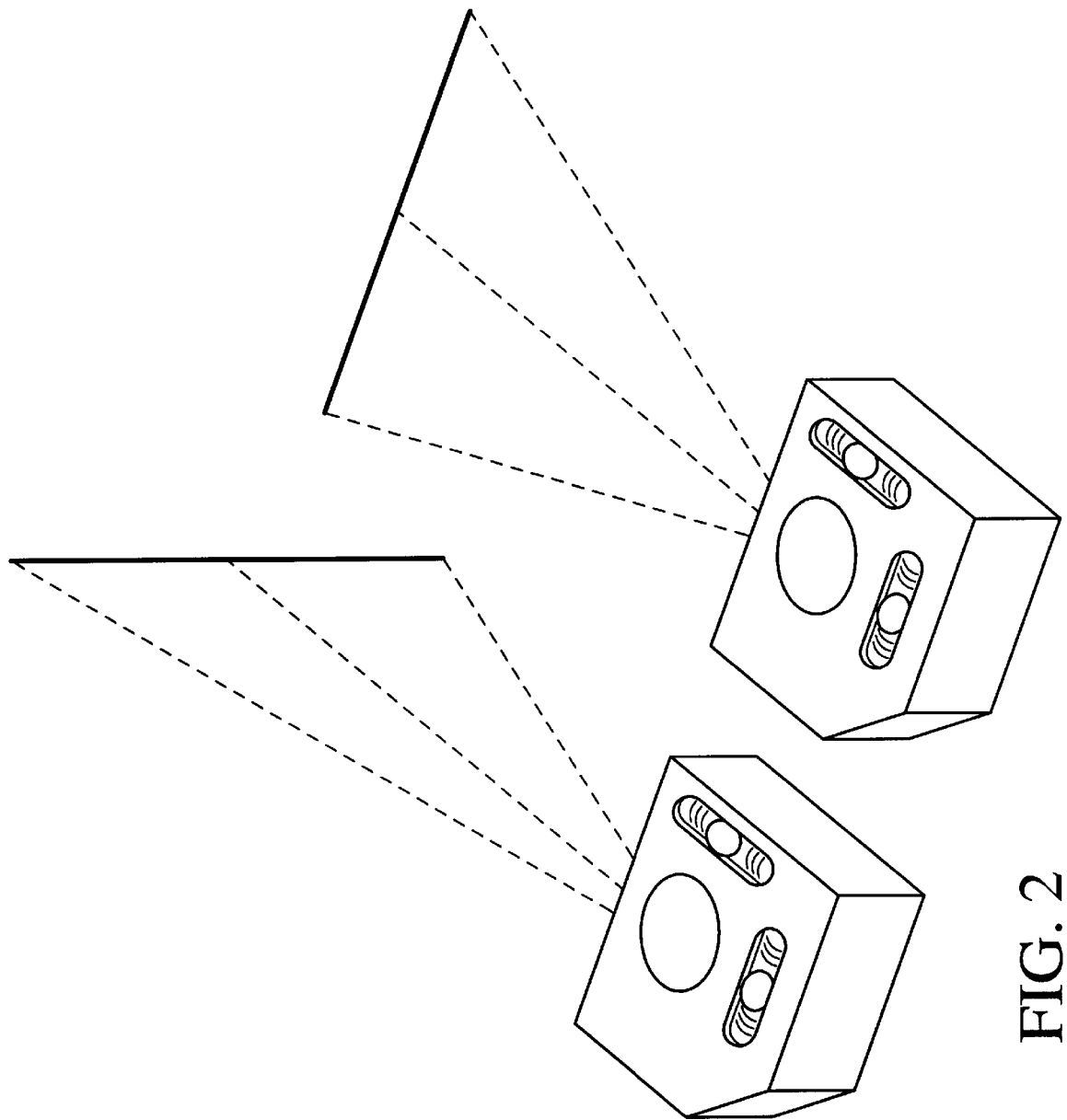
FIG. 2 illustrates an aligned level line ruler and an aligned vertical line ruler.

Referring now to the drawings, wherein like reference numerals represent like parts through out the various views, FIGS. 1A–C show a top view, a bottom view, and a side view respectively of a laser level or plumb line ruler unit. The level or plumb line ruler unit is a generally square alloy ruler assembly with precisely machined planes. Each ruler unit contains a glass lens 1 to generate the laser line. The lens I produces a laser beam that serves as a level (horizontal) or plumb (vertical) line by orienting the main axis of the lens 1 as required for the particular application.

The ruler unit further contains a laser diode module 2 that comprises a laser diode, a collimating lens, a miniature driver circuit, and a barrel. A red LED indicator 3 is active when the ruler unit is in use. The ruler unit is activated and deactivated by an on/off switch 4 which is connected to the power source, generally two 1.5v AAA batteries 5.

The combination of multiple ruler units is accomplished by means of a precisely machined central opening 6. A protruding post 61 extends from the top of the ruler unit. The post 61 is concentric with the opening 6. Thus when a first ruler unit is placed on top of a second ruler unit, and the post 61 of the second ruler unit is received in the opening 6 of the first ruler unit, the two ruler units are perfectly aligned. A top unit may be constructed without a protruding post if desired by the user.

The ruler unit is enclosed in a housing 7 that defines the precisely machined planes. Three corners 9 of the housing 7 of the ruler unit are machined with right angles. The fourth corner 13 of the ruler unit is machined at a 45° angle. Using the 45° angle, the user can produce vertical lines at 45° and 135° relative to a base ruler unit. In order to allow the stacking of multiple ruler units, top and bottom surfaces 15 of the ruler units are precisely machined so as to be parallel to each other.

The ruler units each include two bubble levels 8 that are visible from both the top and the bottom of the ruler unit. The bubble levels 8 are calibrated by adjustment screws 11.

The orientation of the laser diode is determined by calibration screws 10. Positioning the calibration screws 10 moves the lens 1 of the line generator so that the laser beam is emitted at the exact angle desired by the user.

Operation of the ruler combination of the present invention is initiated by positioning at least a lowermost base unit so that the bubbles of the two levels are both centered. The switch 4 is turned on to activate the laser diode so that the laser beam is emitted. The laser diode of each ruler unit being used is adjusted with the calibration screws 10 to ensure that the beam is either horizontal or vertical, according to the requirements of the particular job.

Figure 3:
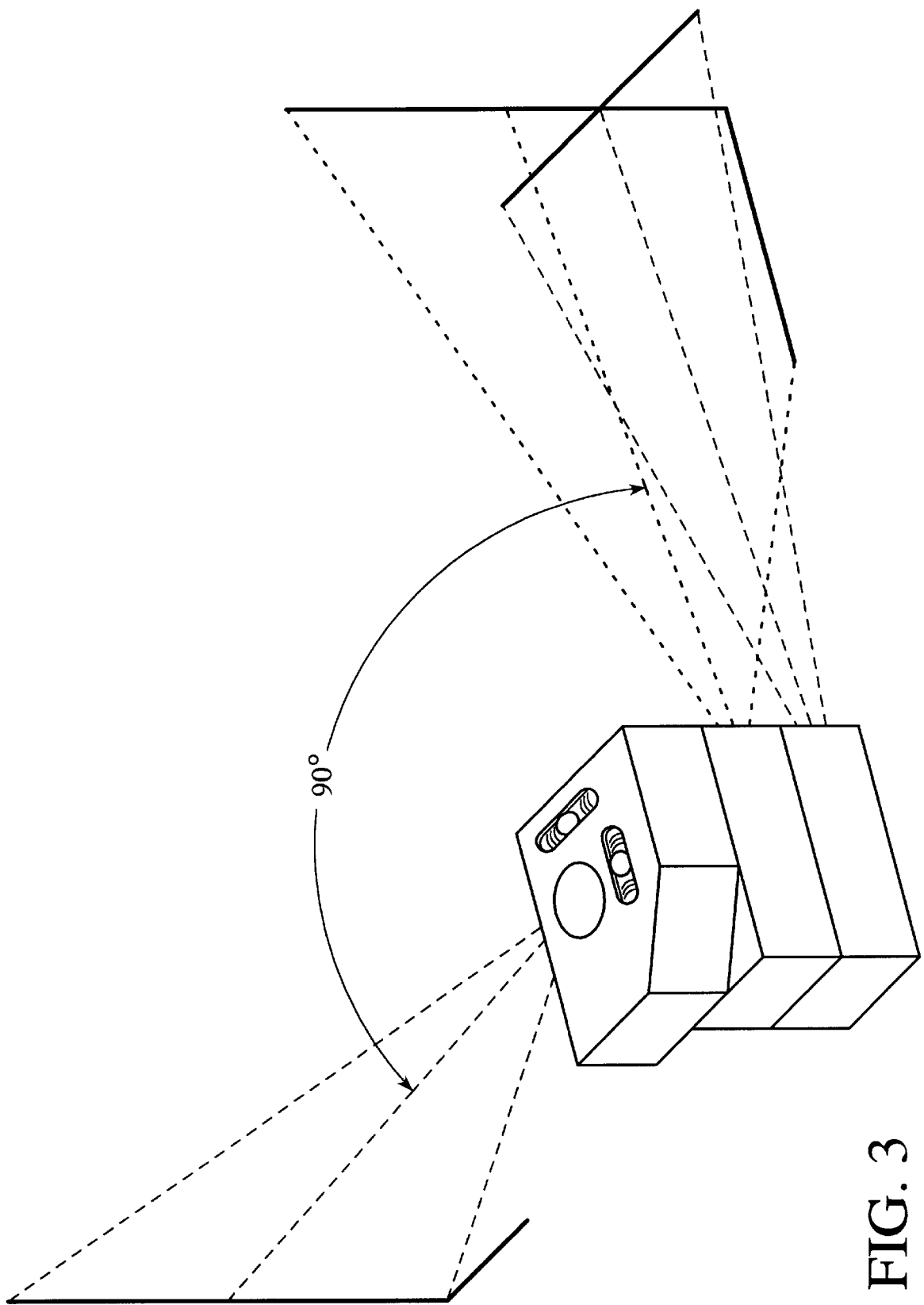
FIG. 3 illustrates the combination of one level line ruler and two plumb line rulers using a central opening and a protruding post.
Figure 4:
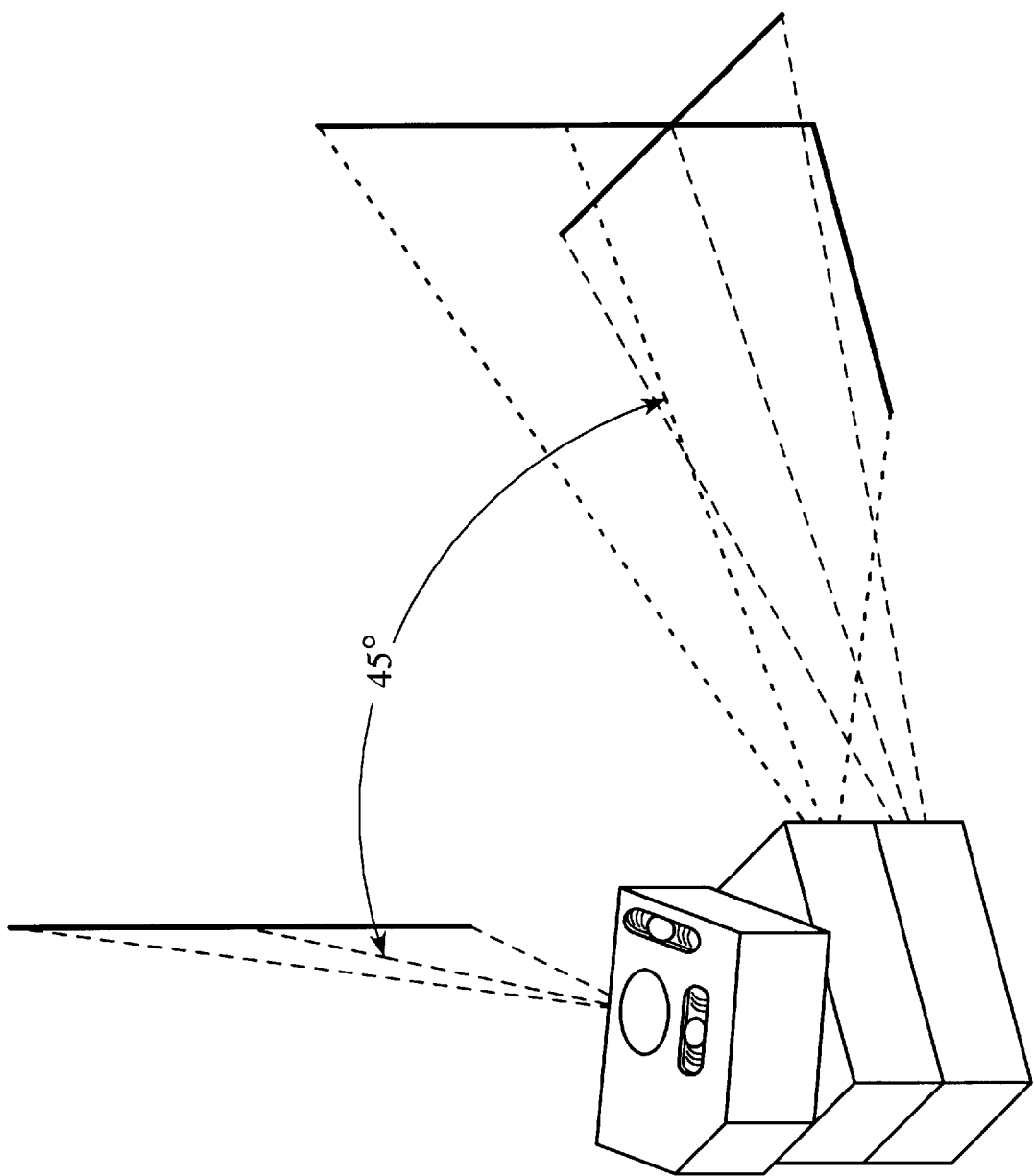
FIG. 4 illustrates the combination of one level line ruler and two plumb line rulers which projects a cross line ahead and shows a 45° line on a side.

Typically, the base unit will be set to generate a standard horizontal reference plane. A second ruler unit installed on top of the base unit may be set to generate a vertical cross line as in FIG. 2. Adding a third ruler unit rotated 90° relative to the. other units allows vertical cross lines at 0° and 90°, as illustrated in FIG. 3.

By using further ruler units, or by rotating the third unit using the square corners 9 and the 45° corner 13 for reference to the second unit, the user can generate as many cross (plumb) lines as desired at 45° increments.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A combination of laser line rulers comprising:
    a plurality of generally square alloy ruler units with precisely machined planes, each said ruler unit includes a means to generate a laser line, and a means to orient and calibrate said laser line, a housing of at least a first one of said ruler units includes a precisely machined opening in a center of a bottom side of said housing, and a housing of at least a second one of said ruler units includes a protruding post extending from a center of a top side of said housing, such that when said first ruler unit is placed on top of said second ruler unit, said post of said second ruler unit is received in said opening of said first ruler unit such that said two ruler units are perfectly aligned, each said housing further includes top and bottom surfaces that are precisely machined so as to be parallel to each other, said housing includes at least one corner machined at a 45° angle, and at least one of said ruler units includes two bubble levels to level said ruler unit; such that by rotating said first ruler unit about said post of said second ruler unit and establishing a proper orientation by use of said square corners and said 45° corners of said ruler units, reference crossing plumb lines are generated by said first ruler unit perpendicular to a base level line projected by said second ruler unit, said crossing plumb lines are generated in 45° increments.

2. The combination of laser line rulers as defined in claim 1 wherein:

at least three ruler units are employed.

3. The combination of laser line rulers as defined in claim 1 wherein:

an uppermost ruler unit is formed without a post protruding from a top side thereof.

* * * * *

UNITED STATES PATENT AND TRADEMARK OFFICE
CERTIFICATE OF CORRECTION

PATENT NO. : 5,864,956
DATED : Feb. 2, 1999
INVENTOR(S) : Dawei Dong

It is certified that error appears in the above-identified patent and that said Letters Patent is hereby corrected as shown below:

On the title page, Item [54] and Column 1, line 1, please delete "LIMB" and insert --PLUMB--.

Signed and Sealed this

Fifteenth Day of June, 1999

Attest:

Q. TODD DICKINSON

Attesting Officer

Acting Commissioner of Patents and Trademarks